United States Patent [19]

Madden et al.

[11] Patent Number: 4,756,053

[45] Date of Patent: Jul. 12, 1988

[54] NOZZLE FLAP HINGE JOINT

[75] Inventors: William M. Madden, Palm Springs; Claude R. Stogner, Palm Beach Gardens; Charles E. Spaeth, Tequesta, all of Fla.

[73] Assignee: The United States of America as represented by the Secretary of the Air Force, Washington, D.C.

[21] Appl. No.: 18,118

[22] Filed: Feb. 24, 1987

[51] Int. Cl.$^4$ .............................................. E05D 11/00
[52] U.S. Cl. ....................................... 16/223; 16/378; 16/386; 239/265.39; 239/265.37
[58] Field of Search ................. 16/223, 234, 378, 386; 239/265.35, 265.37, 265.39, 265.41, 265.11, 127.1, 268, 269, 270, 292; 60/262, 912, 39.83, 230, 232, 271; 244/12.5, 23 D; D23/47; 403/34, 39; 285/98, 118, 185, 917, 163, 168

[56] References Cited

U.S. PATENT DOCUMENTS

| | | |
|---|---|---|
| 1,651,131 | 11/1927 | Joyce . |
| 2,083,970 | 6/1937 | Walter ................................ 285/168 |
| 2,278,356 | 3/1942 | Livingston ......................... 285/168 |
| 2,555,565 | 6/1951 | Leighton . |
| 2,605,619 | 8/1952 | Serduke . |
| 3,003,311 | 10/1961 | Hall ................................. 239/265.39 |
| 3,263,417 | 8/1966 | Hooker . |
| 3,355,695 | 11/1967 | Overesch ............................ 16/223 |
| 3,857,625 | 12/1974 | Crane et al. ........................ 16/223 |
| 4,023,239 | 5/1977 | Stolz . |
| 4,037,405 | 7/1977 | Huenniger et al. ............. 239/265.37 |
| 4,193,617 | 3/1980 | Hitz .................................... 285/917 |
| 4,196,856 | 4/1980 | James ............................... 239/265.39 |
| 4,202,556 | 5/1980 | Makishima . |
| 4,203,684 | 5/1980 | Steckleid . |
| 4,324,407 | 4/1982 | Upham . |
| 4,395,049 | 7/1983 | Schertler . |
| 4,575,006 | 3/1986 | Madden . |
| 4,605,169 | 8/1986 | Mayers . |

FOREIGN PATENT DOCUMENTS

| | | |
|---|---|---|
| 851085 | 10/1960 | United Kingdom .......... 239/265.39 |
| 1096733 | 12/1967 | United Kingdom ................. 16/223 |

Primary Examiner—Nicholas P. Godici
Assistant Examiner—Gerard M. Reid
Attorney, Agent, or Firm—Bobby D. Scearce; Donald J. Singer

[57] ABSTRACT

First and second flaps (10, 12) are joined at a hinge joint formed by a hollow hinge pin (22) passing through alternating lug extensions (18, 20) of the first and second flaps (10, 12). A plurality of flow openings (24) in the hollow hinge pin (22) are provided for establishing fluid communication between the interior of the first flap (10) and the interior of the second flap (12).

3 Claims, 1 Drawing Sheet

U.S. Patent
Jul. 12, 1988
4,756,053
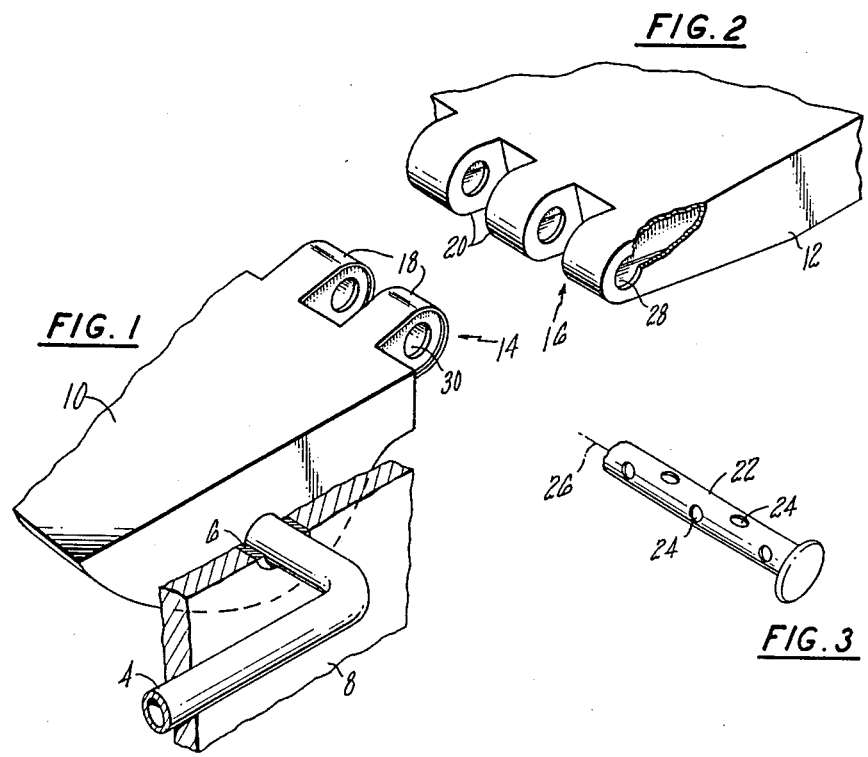
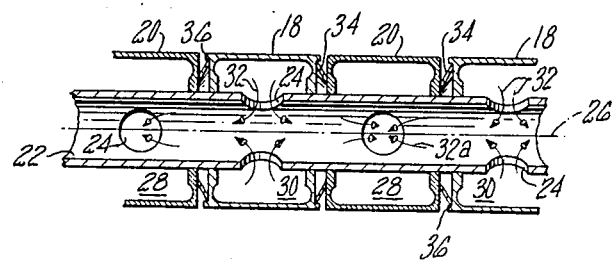

NOZZLE FLAP HINGE JOINT

RIGHTS OF THE GOVERNMENT

The invention described herein may be manufactured and used by or for the Government of the United States for all governmental purposes without the payment of any royalty.

TECHNICAL FIELD

The present invention relates to a hinge joint for a nozzle flap for a gas turbine engine exhaust nozzle.

BACKGROUND OF THE INVENTION

Flaps have long been used in gas turbine engine exhaust nozzle arrangements for selectively diverting portions of the hot engine exhaust gas flow stream. As engine exhaust gas temperatures have increased, it has been necessary to provide exhaust nozzle flaps which are resistant to the high temperature environment, yet lightweight and strong enough to prove functional in aircraft applications.

One method of providing such temperature resistance is to supply a flow of cooling gas, such as air, from the engine compressor or fan to the interior of the subject flaps to achieve the required cooling internally. Such air is typically supplied from a conduit or manifold in the static structure which is connected to the interior of the flap at the connecting joint between the movable flap and the nozzle static structure.

In certain two dimensional vectoring exhaust nozzle arrangements, it has been found advantageous to provide a convergent-divergent exhaust gas flow path to accommodate both augmented and unaugmented engine operation. One such 2-D convergent-divergent nozzle provides a forward convergent flap pivotally supported by the nozzle static structure, and an aftward divergent flap which is pivotally connected at its leading edge to the trailing edge of the convergent flap. In this particular arrangement, the divergent flap is positioned by means of a pair of drive links connected proximate the divergent flap trailing edge and selectively driven by linear actuators secured to the nozzle static structure.

As will be appreciated by those skilled in the art, the entire divergent flap in such an arrangement is freely movable with respect to the nozzle static structure and as a result does not have a support or other connection point through which a supply of cooling air may be delivered. As noted above, the presence of the divergent flap in the hot exhaust gas stream, and in particular during stream diverting orientations wherein the exhaust gas impinges directly on the flap surface, require some form of thermal protection to be provided. As also noted above, the most desirable form of thermal protection is an internal flow of cooling air which must be supplied to the divergent flap interior in sufficient quantity at all times during operation of the engine.

SUMMARY OF THE INVENTION

It is therefore an object of the present invention to provide a supporting pivot or hinge joint between two flap members in a gas turbine engine exhaust nozzle.

It is further an object of the present invention to provide a joint for transferring an internal flow of cooling air between the flap members.

It is further an object of the present invention to provide a hinge joint which accomplishes such transfer over the entire range of pivoting movement of the flap members.

It is further an object of the present invention to provide an air transferring hinge joint which does not require flexible connectors or linear sliding sealing structures.

It is still further an object of the present invention to provide a self-energizing sealing means between the pivoting flap members for preventing leakage of the transferred air.

According to the present invention, first and second internally cooled exhaust vectoring flaps in a high temperature gas turbine engine exhaust nozzle are linked by a linear hinge formed by alternating lug extensions of each flap engaged about a single hollow hinge pin. At least some of the lug extensions include internal passages in fluid communication with the interior of the hollow hinge pin through a plurality of openings disposed therein. Cooling air is transferred between the first and second flaps through the corresponding internal lug passages over the entire range of pivoted movement and without flexible connectors or linear sliding seals as is shown in prior art arrangements. The hinge joint according to the present invention further provides a strong supporting connection between the two flap members which may be manipulated by various actuator means for redirecting the hot exhaust gas flow.

The joint according to the present invention is especially advantageous in vectoring nozzle designs wherein it is desirable to have at least one flap not supported directly by the nozzle static structure, therefore precluding the introduction of cooling air from a conventional static cooling manifold or the like. In particular, a two-dimensional convergent-divergent exhaust nozzle is provided with a forward convergent flap supported directly by the nozzle static structure and movable with respect thereto. A second, divergent flap is joined to the trailing edge of the convergent flap by a hinge joint according to the present invention. Cooling air entering the convergent flap from the static structure is transferred into the divergent flap through the hinge joint according to the present invention for providing the necessary internal cooling over the entire range of relative movement between the flaps.

The invention also provides a means for sealing between adjacent lugs of the hinge joint in the form of a truncated, frustoconical resilient washer disposed around the hollow hinge pin and compressed axially between adjacent lugs. The hinge seal according to the present invention is thus self-energizing and well adapted to compensate for wear as a result of extended use. Both these and other objects and advantages will be apparent to those skilled in the art upon review of the following specification and the appended claims and drawings figures.

BRIEF DESCRIPTION OF THE DRAWINGS

FIG. 1 shows a partial isometric view of a convergent flap in a two-dimensional convergent-divergent gas turbine engine exhaust nozzle.

FIG. 2 shows a partial isometric view of a divergent flap from said nozzle.

FIG. 3 shows a hollow hinge pin for use in a hinge joint according to the present invention.

FIG. 4 shows a cross sectional view of an assembled hinge joint according to the present invention taken through the longitudinal axis of the hollow hinge pin.

BEST MODE FOR CARRYING OUT THE INVENTION

FIGS. 1, 2, and 3 collectively show a disassembled articulated flap assembly having a forward convergent flap 10 and an aftward divergent flap 12. The convergent and divergent flaps 10, 12 are pivotally connected at their respective trailing and leading edges 14, 16. Each flap 10, 12 has a plurality of integral lugs 18, 20 which extend toward the other flap and, when assembled, form an alternating hinge arrangement.

FIG. 3 shows a hollow hinge pin 22 according to the present invention which is inserted through the alternating lug extensions 18, 20 for forming the desired hinge structure. Hollow hinge pin 22 includes a plurality of openings 24 for admitting and exhausting cooling air to the hollow pin interior as discussed hereinbelow.

Each of the flaps 10, 12 according to the illustrated embodiment are also hollow for receiving a flow of cooling air supplied from an upstream gas turbine engine compressor (not shown) for protecting the flap surfaces in contact with the hot exhaust gases (not shown). A generally similar arrangement of flaps in a vectoring exhaust nozzle is fully illustrated and discussed in U.S. Pat. No. 4,605,169 and will not be repeated herein.

In the illustrated embodiment the convergent flap 10 is supported by the nozzle static structure 8 and pivotable about a bearing assembly 6 disposed therein. Air for cooling the flap 10 is supplied through a conduit or manifold 4 connected to a source of pressurized, relatively cool air such as the engine compressor.

FIG. 4 is a cross sectional view of an assembled hinge joint according to the present invention taken along the longitudinal axis 26 of the hollow hinge pin 22. The lug extensions 18, 20 of the respective flaps 10, 12 are shown in an alternating arrangement and include internal flow channels 28, 30 for alternately admitting and receiving cooling air 32 with respect to the interior of the hollow hinge pin 22.

More particularly, cooling air 32 from the interior of the convergent flap 10 flows through passages 30 in the convergent flap lug extension 18, entering the interior of the hollow hinge pin 22 through one of the plurality of corresponding openings 24 disposed therein. The cooling air 32 flows longitudinally 32a through the hinge pin 22, passing out of the hinge pin 22 through an opening 24 into the internal passage 28 of the convergent flap lug extension 20 as shown.

The hinge joint according to the present invention thus provides a means for transferring a flow of cooling air from the interior of the convergent flap 10 to the interior of the divergent flap 12 which does not require the use of flexible expansion or other members, or the use of a linear sliding seal or the like. The cooling air entering the downstream divergent flap 12 is directed as necessary to achieve the desired internal cooling and is finally exhausted from openings or other vents (not shown).

As the cooling air 32 is typically at an elevated pressure with respect to the surrounding environment, the joint according to the present invention provides a plurality of interlug sealing washers 34 for forming a gas tight barrier therebetween. The sealing washers 34 are frustoconical in shape and are disposed about the hinge pin 22 as shown in FIG. 4. The individual washers 34 are compressed axially between the adjacent lugs 18, 20 for forming a preloaded, self-energizing seal which is well adapted to accommodate wear before losing the inherent sealing capability.

One further feature also shown in FIG. 4 is associated with the lug extension 18 in the form of an annular lip 36 extending parallel to the hinge pin axis 26 for radially retaining the frustoconical sealing washer 34. This positioning lip 36 holds the washer 34 both during initial joint assembly and during operation by contacting the radially outermost portion thereof. It will further be appreciated by those skilled in the art that additional cooling holes and vents (not shown) may be placed as appropriate in the hinge pin 22, lug extensions 18, 20, and/or the sealing washers 34 to provide any required or desired local cooling effect.

It should also be noted that the foregoing discussion and appended drawing figures are intended only to serve as an illustrative example of one embodiment of the hinge joint according to the present invention, and that the scope of the invention is defined solely by the hereinbelow presented claims.

We claim:

1. A flap assembly hinge joint for a gas turbine engine exhaust nozzle, comprising:
   (a) a first hollow flap having a first chamber defined therein and being adapted for promoting flow of cooling air therethrough, and a first plurality of linearly spaced apart first lug extensions defined along a first flap edge thereof and aligned along a pivot axis near said first flap edge;
   (b) a second hollow flap pivotally mounted to said first hollow flap and having a second chamber defined therein and being adapted for promoting flow of cooling air therethrough, and a second plurality of linearly spaced apart second lug extensions defined along a second flap edge thereof, said second flap disposed adjacent said first flap with corresponding said second lug extensions alternated with said first lug extensions along said pivot axis;
   (c) each of said first lug extensions and said second lug extensions including means defining passageways therethrough in communication with the corresponding said first chamber and said second chamber, and further including means defining axial openings of preselected size aligned along said pivot axis; and
   (d) a hollow, generally cylindrically shaped hinge pin, disposed along said pivot axis and received by said axial openings in alternate said first lug extensions and said second lug extensions, said pin further including a third plurality of openings disposed along the length of said pin, said openings located in communicating relationship with respective said passageways in said first lug extensions and said second lug extensions of the respective said first hollow flap and said second hollow flap.

2. The flap assembly hinge joint as recited in claim 1, further comprising a frustoconical shaped annular sealing washer disposed about said pin and resiliently compressed axially between each adjacent first and second lug extension for establishing a gas tight rotational seal therebetween.

3. The flap assembly hinge joint as recited in claim 2, further comprising an annular retaining lip on each of one said plurality of lug extensions for retaining each said sealing washer at the outer edge thereof.

* * * * *